Aug. 3, 1926. 1,594,776
V. HAGGER
COWLING AND THE LIKE FOR AIRCRAFT AND OTHER STRUCTURES
Filed April 1, 1926
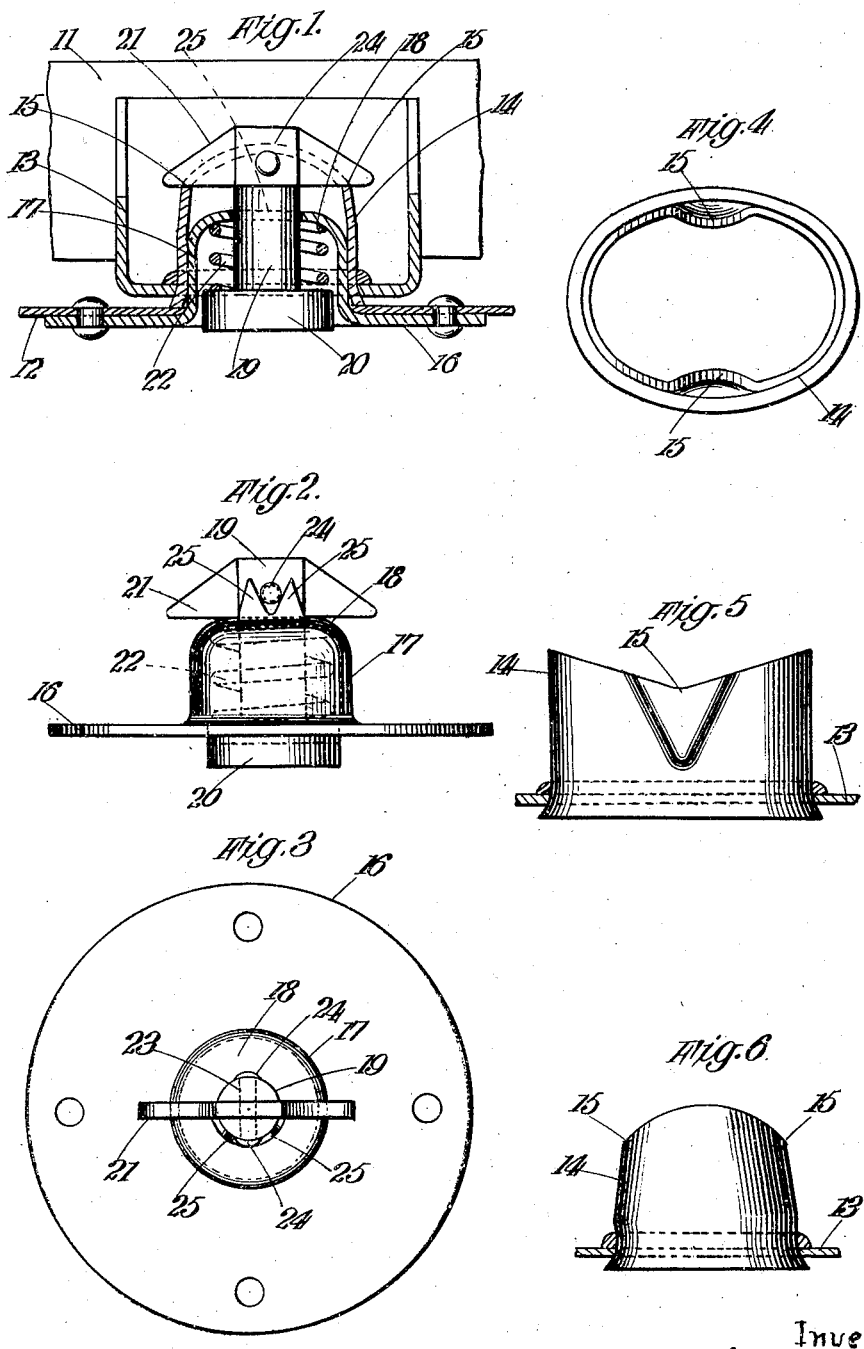
Inventor
Victor Hagger
Attorney.

Patented Aug. 3, 1926.

1,594,776

UNITED STATES PATENT OFFICE.

VICTOR HAGGER, OF EAST ACTON, ENGLAND, ASSIGNOR TO CHARLES RICHARD FAIREY, OF CRANFORD LANE, HAYES, ENGLAND.

COWLING AND THE LIKE FOR AIRCRAFT AND OTHER STRUCTURES.

Application filed April 1, 1926, Serial No. 99,023, and in Great Britain February 13, 1925.

This invention relates to the attachment of cowling and the like (hereinafter referred to shortly as "cowling") of aircraft and other structures, and has for its object to provide, for the purpose of detachably securing cowling to the framework or other portion of the structure, an improved device (somewhat in the nature of a turnbutton) such that, whilst attachment and detachment can be effected instantly, no appreciable outward projection nor re-entrant concavity will be presented, so that in the case of aircraft, for example, the device will offer a minimum of resistance to the passage of the machine through the air.

The improved device of the present invention consists of two members mounted respectively on the cowling and on the structure to which the cowling is to be detachably secured; that member which is on the structure comprising a socket presenting an open-ended passage of non-circular cross-section the lip at the inner extremity of which is notched at opposite sides of the narrowest part, whilst that member which is on the cowling comprises a stud rotatable in and slidable through a seating on the cowling and carrying at its inner end a transverse cotter of a length such that it can be passed through the non-circular passage only when extending in the direction of the widest part thereof; the arrangement permitting of the stud being first passed through said passage until the cotter is clear of the inner extremity of the passage, and thereafter turned through part of a revolution to allow the cotter to engage, under spring action, in the notches at opposite sides of the narrowest part of said extremity.

In the accompanying drawings, which illustrate one form of the invention as applied to aircraft, Figure 1 is an axial section of the device showing the parts assembled in use, the section being taken on the plane of the minor axis of the passage through the socket. Figure 2 is a side elevation of the spring-influenced stud with its seating, shown separately, as viewed in a direction at right angles to the plane of the section in Figure 1, and Figure 3 is an elevation of the same as viewed from the inner end; the stud with its cotter being shown in Figures 2 and 3 as turned through a right angle relatively to the seating, as compared with the position shown in Figure 1. Figure 4 is an elevation of the tubular socket, shown separately, as viewed from the inner end, and Figures 5 and 6 are side elevations of the same, as viewed in directions respectively perpendicular and parallel to the major axis of the non-circular passage.

Referring to the drawings, 11 (Figure 1) represents a portion of the structure to which the cowling is to be applied. At each point where the cowling 12 is to be attached to the structure, there is secured, by means of a suitable bracket 13, a short length 14 of tubing of oval cross-section whereof the axis is at right angles to the plane in which the cowling is to extend, the edge of the inner end of said tube 14 being cut away at opposite points 15, 15 of its minor axis so as to present notches merging gradually into the general contour of said end. The cowling 12 is suitably apertured and has attached to it by a flange 16 a substantially cylindrical box 17 projecting inwardly through the aperture and of a diameter slightly less than the length of the minor axis of the oval tube 14. The box 17 has its inner end or bottom closed as at 18 but adapted to give passage to, and guide, the shank of a stud 19 having at its outer end a head 20 slidable in the box 17 and notched or otherwise adapted to be engaged by a screw-driver or like tool, whilst at its inner end the stud carries a transverse cotter 21 whereof the length is less than that of the major axis, but greater than that of the minor axis of the oval tube 14. The bottom 18 of the box 17 serves as an abutment for one end of a coiled spring 22 housed under compression within the box and bearing by its other end against the head 20 of the stud.

The arrangement is such that, when the cowling 12 is applied in position, with the cotter 21 lying in the direction of the major axis of the oval tube 14, the cotter and the cylindrical box 17 can pass into the oval tube. By then applying a screw-driver to the head 20 of the stud 19, the latter can be forced axially against the action of the spring 22 until the cotter 21 is beyond the inner end of the oval tube, whereupon the stud 19 may be turned so as to bring the cotter into the minor axis of the tube, in which position it will be retained (see Figure 1) by its reception in the notches 15 under the stress of the spring 22.

The cotter 21 is secured in a transverse notch at the inner end of the stud 19 by means of a cross-pin or rivet 23 the ends or heads 24 of which protrude, and, in order to facilitate the correct positioning of the cotter 21 relatively to the major axis of the tube 14, preparatory to the application of the cowling to the structure, the closed inner end 18 of the cylindrical box 17 is formed, close to the aperture therein, with a pair of rearwardly-projecting lugs 25 between which one of the rivet-heads 24 engages, as indicated in Figure 2, when the cotter extends in the direction of said major axis.

In order that the device may offer no appreciable resistance to the passage of the aircraft through the air, it is desirable that the diameter of the head 20 of the stud 19 should be only slightly less than the internal diameter of the cylindrical box 17, and that, when the cotter 21 lies within the notches 15, the outer surface of the head 20 should be substantially flush with the outer surface of the flange 16 whereby the box 17 is secured to the cowling 12, and that said flange should be as thin as practicable. If desired, the cowling 12 may be offset inwardly to provide a recess in which the flange 16 may lie with its outer surface flush with that of the cowling. Alternatively, said flange may be riveted to the inner surface of the cowling, in which case the outer surface of the head of the stud should be substantially flush with that of the cowling.

I claim:—

1. A device for detachably securing cowling or the like to the framework of aircraft and similar structures consisting of two cooperating members mounted respectively on the cowling and on the structure to which the cowling is to be detachably secured, the member mounted on the structure comprising a socket presenting an open-ended tubular passage, of non-circular cross-section, provided with a lip at the inner extremity thereof which is notched at opposite sides of the narrowest part, while the member mounted on the cowling for co-operation with said first named member comprises a stud rotatably mounted in and slidable through a seating secured on the cowling, said stud carrying at its inner end a transverse cotter of a length such that it can be passed through the non-circular passage only when extending in the direction of the widest part thereof, but is longer than the narrowest part, and a spring co-operating with said stud for sliding it outward in its seating, the arrangement being such as to permit the stud and cotter, after being first passed through said passage until the cotter is clear of the inner extremity thereof, to be turned through part of a revolution to allow the cotter, under the action of said spring, to engage the notches at opposite sides of the narrowest part of said passage, and means at the outer end of said stud for rotating the stud and cotter substantially as set forth.

2. A device as claimed in claim 1, wherein the stud which carries the transverse cotter has at its outer end a head provided with means adapted for engagement by a tool, whereby the stud and cotter may be rotated, the stud passing through and being guided by an aperture at the bottom of, and by the head fitting in, the seating, and being influenced by said spring which is held in compression between said head and the bottom of the seating, substantially as set forth.

3. The device as claimed in claim 1, wherein cooperating means between the stud and cotter and said seating are provided for positioning and holding said cotter in a predetermined position for insertion into said non-circular passage, substantially as described.

VICTOR HAGGER.